L. BOIRAULT.
PIPE COUPLING DEVICE FOR RAILWAY AND TRAM CARS.
APPLICATION FILED OCT. 31, 1912.

1,155,876.

Patented Oct. 5, 1915.

WITNESSES:
William E. Baker.
John P. Davis

INVENTOR:
LOUIS BOIRAULT,
BY Munn & Co
ATTORNEYS

UNITED STATES PATENT OFFICE.

LOUIS BOIRAULT, OF PARIS, FRANCE.

PIPE-COUPLING DEVICE FOR RAILWAY AND TRAM CARS.

1,155,876. Specification of Letters Patent. Patented Oct. 5, 1915.

Application filed October 31, 1912. Serial No. 728,958.

*To all whom it may concern:*

Be it known that I, LOUIS BOIRAULT, a citizen of the Republic of France, residing at 58 Rue Taitbout, Paris, in the Republic of France, have invented certain new and useful Improvements in Pipe-Coupling Devices for Railway and Tram Cars, of which the following is a specification.

This invention relates to pipe coupling devices for railway and tram cars and has for its object to so construct a device of this character that it will permit of air, steam, gas and other similar fluid pipes being brought into operative engagement with each other by simply coupling the cars together. The said device is secured on the coupling apparatus of the car, so that when the two cars are coupled automatically, the pipe coupling devices are brought to bear on one another. The automatic car coupling apparatus may be of any suitable system if only provided with guiding members to insure the register of the pipe coupling devices on the cars being brought together, and if the play between the coupling apparatus is very slight.

The device according to this invention comprises a valve-box which is secured to the coupling apparatus and in which are arranged a valve opening toward the interior of the box and a spring which serves to hold the valve on its seat.

When the cars are brought together, the respective valves are pushed away from each other through the medium of rubber rings which make a hermetic joint, so that such valves are moved away from their seats and communication is established between the valve-boxes and the pipes secured thereto. On the cars being uncoupled, the valves are brought back to their seats by the springs even before the rubber rings are separated so that there is no loss of fluid. Such device avoids the use of any cocks.

Two embodiments of this invention are shown by way of examples in the accompanying drawings, in which:—

Figure 1:
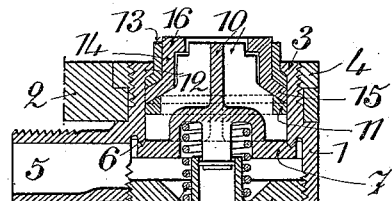
Figure 2:
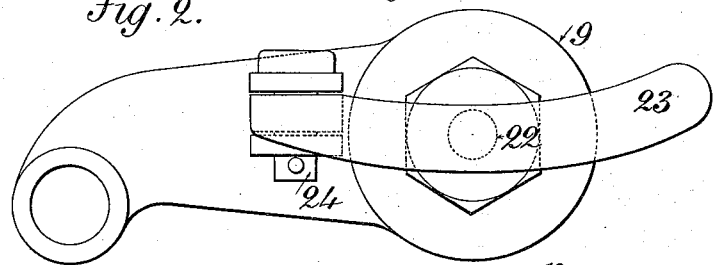
Figure 3:
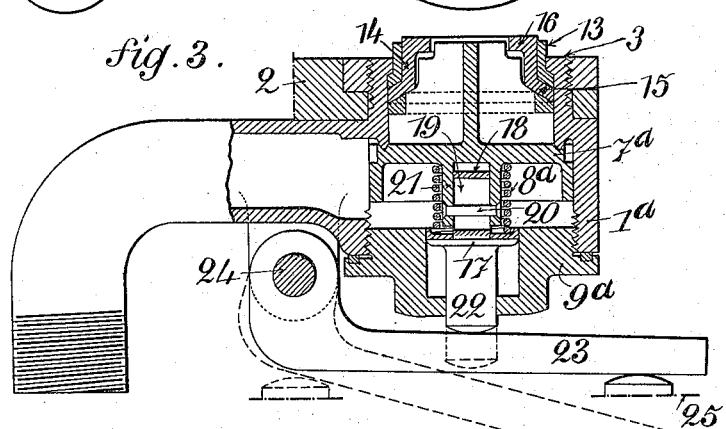
Figure 4:
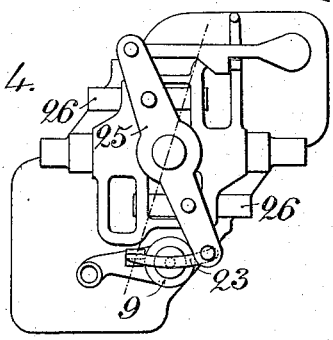
Figure 5:
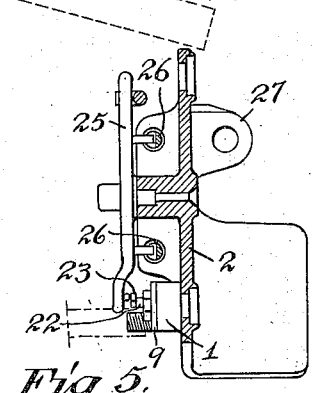

Figure 1 is a sectional view of the first embodiment. Figs. 2 and 3 are respectively an elevation and a horizontal section of the second embodiment. Fig. 4 is a diagram showing the arrangement of such second embodiment on a plate of the Boirault system coupling, seen from behind. Fig. 5 is a vertical section on the axial line of the car coupling, the view showing the valve box mounted on the car coupling device.

In Fig. 1, the valve-box 1 is secured on a coupling plate 2; the valve-box is open at the front face and is located behind the latter and comprises a neck 3 which extends into an opening of the plate where it is maintained by a nut 4 located in front of such plate. The box 1 carries a lateral pipe 5 designed to be connected with an air, steam, or other similar pipe. Within the box a seat 6 is provided which is turned away from the opening in the front of the box or toward the interior of the box against which a valve 7 is pressed by a spring 8 which bears against a closure 9 which may, as illustrated, consist of a threaded plug which takes into the box or valve casing 1. The valve is guided in the neck 3 by wings 10 placed cross-wise and joined together by a ring 11. At the end of the neck 3 the inner wall of the box is provided with a shoulder or flange 12 which surrounds the opening in the front of the box and serves to retain a metal ring 13, surrounding a rubber ring 14 having a peculiar contour. The inner end 15 of such rubber ring is cone-shaped; it is applied by its periphery against the inner wall of the neck 3 and is held between the inner end of the ring 13 and the ring 11 which are correspondingly cone-shaped. Again, the outer end of the ring 14 is provided with an internal annular flange 16 presenting a broad surface designed to bear against the similar flange of the coupling device of the opposite coupling apparatus. When the valve is applied to its seat, the ring 11 holds the ring 14 and the ring 13 in such a manner that the latter projects beyond the box 1 and the rubber ring projects beyond the metal ring. When two cars are brought together, the rubber rings which protrude somewhat beyond the metal rings and beyond the wings 10 of the valves, come in contact and secure immediate air-tightness; then they compress each other until the metal rings 13 and the wings of the valves are brought in contact with each other. During the further movement of the cars, the valves are pushed away from their seats and communication is established between the valve-boxes and the pipes connected therewith. The play behind the valves is so calculated that one of them can be pushed to the bottom of its box before the cars have come in contact with each other. Such arrangement makes the opening of both valves quite sure. When the cars separate the valves are applied on their seats under the action of the springs and the separation of the rings 14 only takes place afterward, so that there is no loss of fluid. By these means an airtight fluid passage is secured from one neck 3 to a similar neck on an opposed coupling section before the opening of the valves, and the closure of the latter is effected before the air-tightness disappears. This embodiment of the invention is suitable for the coupling of any gas, compressed-air, steam, or other similar fluid pipes. However, if it is applied in connection with airbrake pipes, it presents an inconveniency in that, should there be a breakage of the couplings, the simultaneous breakage of the respective coupling of the necks would have no influence on the brakes as the valves prevent any escapement of the air.

The second embodiment (Figs. 2 to 4) obviates such defect. In such second embodiment, the spring $8^a$ for closing the valve does not bear against the plug $9^a$, but against a small piston 17 slidable in a cylindrical housing in the said lid. The inner face of the piston 17 carries a rod 18 provided with a groove 19 through which passes a pin 20 secured across a hollow projection 21 of the valve $7^a$, so that the displacement of the piston with respect to the valve is limited in both directions. The other face of the piston carries a stem 22 which passes loosely through an opening of the plug $9^a$ and against which a movable arm 23 is enabled to bear, such arm being pivoted at 24 to the valve-box $1^a$. The arm 23 is so placed and shaped that it can be actuated by the double lever 25 which controls in the known manner the bolts 26 of the Boirault coupling apparatus. When the lever 25 holds the bolts open, as shown in full lines in Fig. 4, it lies in front of the free end of the arm 23 and holds the latter (Fig. 3) in such a position that it pushes the piston 17 and compresses the spring 8 against the valve. If then two cars provided with the automatic coupling are coupled, the lever 25 of each coupling is unlocked in the known manner and brought yieldingly back to the position shown in dotted lines, a position in which the bolts are closed; with the result that the arm 23 is then set free by the lever 25 and is enabled to move away from the rod 22, as is also shown by the dotted lines; at the same time, the valves $7^a$ are pushed away from each other and put the respective brake pipes in communication with one another.

As to the separation of the couplings, two cases may occur; firstly, if the couplings are uncoupled by hand in bringing the lever 25 back to the position for opening the bolts, the arm 23 pushes the piston 17 so that the spring $8^a$ is compressed; so the valve will close when the cars are separated, without letting the air escape and hence without any operation of the brakes. Secondly, should the separation take place accidentally on account of the breakage of the coupling, the lever 25 remains in the position shown by the dotted lines, the arm 23 remains free and the spring $8^a$ does not close the valve, so that the air escapes from the pipe and applies the brakes as soon as the cars separate. The area of the piston 17 is furthermore so determined that, when the air escapes, the pressure of the air on the piston will be greater than the difference of the air pressures on both the faces of the valve and prevents the latter from being closed by the action of the escaping air.

While the device may be employed in connection with any suitable automatic car coupling apparatus, in the drawings it is illustrated in connection with the Boirault automatic car coupling. As shown in Fig. 5 on the inner face of the car coupling plate 2 are arranged the valve box 1, the bolts 26 and the lever 25 which controls the bolts. On the outer face is shown one of the perforated horns 27 in which engage the bolts of another similar coupling, and one of the lugs for guiding the horns of such coupling. When the cars are brought together they are automatically coupled by the bolts of one coupling engaging the openings in the horns of the other coupling. It is to be understood, therefore, that when two cars provided with applicant's device are brought together they are coupled automatically by the car coupling devices employed. The valve boxes are secured to the car coupling devices, and the pipes to which the air or steam pipes are connected are carried by the valve boxes. When two cars are coupled, the valve boxes of these cars are automatically brought into engagement with each other and cannot be removed away from each other as long as the car couplings are locked together.

It must be understood that the device serving to put the valve under the dependence of the opening and closing of the automatic coupling may be varied according to the character of the latter. Broadly speaking, all that need be done is to prevent the action of the spring from closing the valve so long as the coupling members are in the coupling position, and to render to such spring its efficiency on the valve so long as the said members are in the uncoupled position; it will be easy to find for each kind of coupling mechanical connections suitable for such conditions.

The coupling plate 2 in Fig. 3 is the same as in the form shown in Fig. 1, and the wings 10ª and ring 11ª are like the wings 10 and ring 11. Similarly, the elements 13, 14, 15 and 16 are the same in all respects in the form shown in Fig. 3 as in the form shown in Fig. 1.

Having thus described my invention, I claim as new and desire to secure by Letters Patent:

1. A pipe coupling device comprising a box having an opening in its front face and a lateral pipe, the inner wall of such box having a shoulder surrounding the said opening and a seat turned away from such opening or toward the interior of the box, a spring actuated valve, adapted to be applied on to such seat and having guide wings and a ring joining such wings to one another, a rubber ring surrounding the wings of the valve and a metal ring surrounding the said rubber ring, such metal ring having on its inner end a flange adapted to impinge the said inner shoulder of the box and the rubber ring having on its inner end a flange which extends between the flange of the metal ring and the ring of the wings of the valve until it contacts with the inner wall of the box.

2. A pipe coupling device comprising a box having an opening in its front face and a lateral pipe, the inner wall of such box having a shoulder surrounding the said opening and a seat turned away from such opening or toward the interior of the box, a valve adapted to be applied on to the said seat and having guide wings and a ring joining such wings one to another, a rubber ring surrounding the wings of the valve, a metal ring surrounding the said rubber ring, such metal ring having at its inner end a flange adapted to impinge against the said inner shoulder of the box and the rubber ring having at its inner end a flange which extends between the flange of the metal ring and the ring of the wings of the valve until it contacts with the inner wall of the box, the wall of the box opposite to the said front opening being provided with a cylindrical cavity and with an opening at the bottom of such cavity, a movable piston in the said cavity and having a rod which passes through the opening at the bottom of such cavity, and a spring compressed between the valve and the said piston, such piston being designed to be actuated by an outer member forming a part of an automatic coupling for the purpose specified.

In testimony, that I claim the foregoing as my invention I have signed my name in presence of two subscribing witnesses.

LOUIS BOIRAULT.

Witnesses:
ALPHONSE BOIREAUX,
MAURICE ROUX.

Copies of this patent may be obtained for five cents each, by addressing the "Commissioner of Patents, Washington, D. C."